(12) United States Patent
Dunfee et al.

(10) Patent No.: US 7,228,048 B1
(45) Date of Patent: Jun. 5, 2007

(54) LIQUID TUBE AND ELECTRICAL CABLE CLAMP WITH LOCKING FEATURES

(75) Inventors: William D. Dunfee, Newark, DE (US); David G. Henderson, Hockessin, DE (US); Thomas E. Weitkamp, Newark, DE (US)

(73) Assignee: Dade Behring Inc., Deerfield, IL (US)

( * ) Notice: Subject to any disclaimer, the term of this patent is extended or adjusted under 35 U.S.C. 154(b) by 0 days.

(21) Appl. No.: 11/384,530

(22) Filed: Mar. 20, 2006

(51) Int. Cl.
*G02B 6/00* (2006.01)
*H01R 6/24* (2006.01)
*H01R 6/26* (2006.01)

(52) U.S. Cl. .................................. 385/136; 439/400
(58) Field of Classification Search ................ 439/400, 439/402–406
See application file for complete search history.

(56) References Cited

U.S. PATENT DOCUMENTS

| 4,068,912 | A | * | 1/1978 | Hudson et al. ............. 439/405 |
| 5,498,172 | A | | 3/1996 | Noda ......................... 439/404 |
| 5,980,303 | A | | 11/1999 | Lee et al. ................... 439/405 |
| 6,328,592 | B1 | | 12/2001 | Burke et al. ................ 439/417 |
| 6,398,581 | B1 | | 6/2002 | Baier et al. ................ 439/404 |
| 6,575,780 | B1 | * | 6/2003 | Lee ............................. 439/404 |
| 6,817,887 | B2 | | 11/2004 | Jones et al. ................ 439/405 |
| 6,837,737 | B2 | | 1/2005 | Baier et al. ................ 439/402 |
| 6,851,964 | B2 | | 2/2005 | Miller ........................ 439/372 |
| 2004/0151465 | A1 | * | 8/2004 | Krampotich et al. ........ 385/136 |

OTHER PUBLICATIONS

Front cover and pp. 109-117 of Richco Inc. catalog 25R.*

* cited by examiner

*Primary Examiner*—Michelle Connelly-Cushwa
*Assistant Examiner*—Chris Chu
(74) *Attorney, Agent, or Firm*—Leland K. Jordan (57) ABSTRACT

An improved mounting clamp adapted to simultaneously secure flat ribbon cables and a number of fluid tubes to a surface and having a locking feature to facilitate assembly and release.

5 Claims, 7 Drawing Sheets

LIQUID TUBE AND ELECTRICAL CABLE CLAMP WITH LOCKING FEATURES

FIELD OF THE INVENTION

The present invention relates to a lockable clamp for simultaneously securing a number of liquid carrying tubes and at least one ribbon electrical cable to a surface.

BACKGROUND OF THE INVENTION

Various types of analytical tests related to patient diagnosis and therapy can be performed by analysis of a liquid sample taken from a patient's infections, bodily fluids or abscesses. These assays are typically conducted with automated clinical analyzers onto which liquid patient samples have been loaded. The analyzer extracts liquid sample from a container and combines the sample with various reagents in special reaction cuvettes. Usually the sample-reagent solution is incubated or otherwise processed before being analyzed. Analytical measurements are performed using a beam of interrogating radiation interacting with the sample-reagent combination to generate absorption readings or the like. The readings allow determination of end-point or rate values from which an amount of analyte related to the health of the patient may be determined using well-known calibration techniques.

Within such analyzers, a large number of liquid sample and reagent aspiration/dispensing probes are usually employed in order to extract incoming sample from a container, dispense aliquot portions of said sample into an aliquot array, to aspirate aliquot samples from the array and dispense aliquot samples into a reaction cuvette, and/or to extract reaction reagents from a container and directly dispense aspirated reagents into a reaction cuvette. In addition, within such analyzers, a very large number of electrical cables are interconnected between the various electromechanical controlling and controlled devices. For space-saving reasons, a popular electrical cable is shaped like a flat ribbon and is formed of a number of electrical conductors covered by an insulator and placed side-by-side. Ribbon electrical cables are frequently utilized to direct electrical signals between stationary printed circuit boards and electromechanical devices that are translated horizontally and vertically for millions of cycles. In a typical static application a latch may be sufficient to retain the cable securely. However, in applications in which substantial and/or sustained movement is encountered like described, latches are usually found to be inadequate over periods of sustained use. Thus, a need exists for a retaining device which secures the cable securely irrespective of substantial sustained movement.

In order to minimize impact upon patients as well as to decrease the costs of clinical assays, the volumes of liquid sample aliquots and reagents are increasingly made smaller, in the range of about 1 microliter to five microliters; therefore, the pumping systems associated with sample and reagent aspiration and dispensing probes must be capable of handling precisely known and controlled liquid volumes. Almost all sample and reagent aspiration/dispensing probes are mounted on translatable arms having both horizontal and vertical motion in order to translate probes between locations as well as to raise and lower probes into and out of containers. Consequently, a popular practice is to attach a probe to a pumping system using flexible tubing; furthermore, to reduce pumping volume uncertainties, the tubing is filled with an inert liquid, as opposed to air, between the pumping system and the probe. The tubing is also generally secured on and between stationary and/or moving parts using a guide with circular dimensions. Traditionally, clamps have been available to secure only an electrical cable or to secure only liquid tubing. In addition to requiring the assembly of a large number of tubing or ribbon clamps, not all clamps are provided with locking features allowing easy assembly and release. It has also been discovered, however, that the tubing must be precisely placed and maintained along the central radius of curvature of such a guide in order to prevent a "peristaltic-type" pumping action of the fluid within the tube as the curved section of tubing moves. If the tubing falls to the inside of the guide, the tubing is slightly compressed; likewise, if the tubing falls to the outside of the guide, the tubing is slightly stretched. Both actions cause a change of volume of fluid inside the curved portion and a pumping action is created as the probe is translated. This false pumping is in addition to the controlled pumping, thereby adversely affecting the accuracy of the aspirated or dispensed sample/reagent liquid.

SUMMARY OF THE INVENTION

The present invention meets the separate needs for securing flat cables and round tubes by providing a single clamp adapted to simultaneously secure at least one flat ribbon electrical cable and a number of fluid tubes to a surface and having a locking feature to facilitate assembly and release. Such a device reduces both the total number of clamps required and their associated costs. In a particular embodiment of such a cable-tubing clamp, the clamp is used at both ends of a flexible router, one cable-tubing clamp mounted proximate a stable electrical power and control source, the other end located proximate a moveable liquid aspiration/dispensing probe. During assembly, the clamp is opened to expose grooves for securely inserting round liquid tubes, a flat ribbon cable is applied over the tubes and a locking clasp is lowered over the cable and lip-locked in place. A tab on the lip-lock facilitates entry of the lip-lock during assembly and also prevents the locking tab from being pulled sideways by forces acting on either the tubes or the cable(s).

BRIEF DESCRIPTION OF THE DRAWINGS

The invention will be more fully understood from the following detailed description thereof taken in connection with the accompanying drawings which form a part of this application and in which.

DETAILED DESCRIPTION OF THE INVENTION

Figure 1:
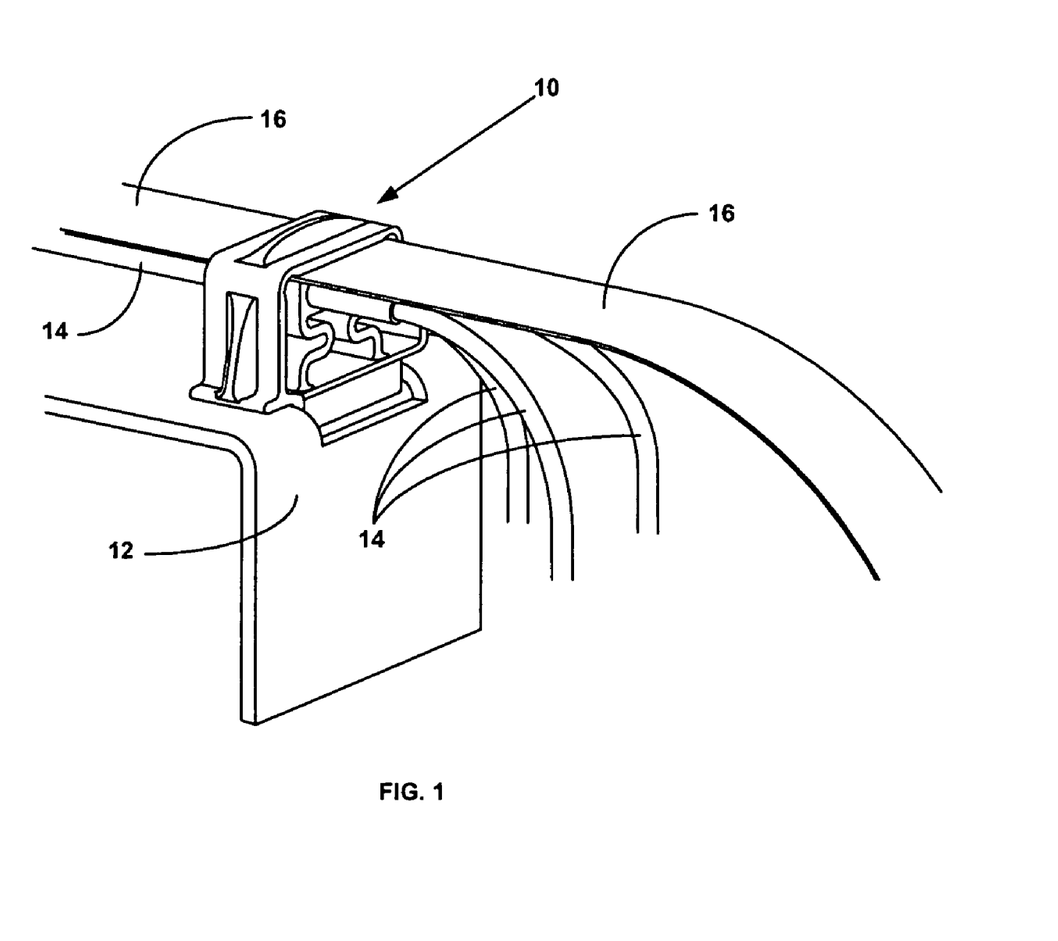
FIG. 1 is a right side perspective assembly view of the tube and cable clamp of the present invention attached to a frame member and shown clamping three tubes and a flat electrical ribbon cable.

FIG. 1 is a perspective assembly view of the tube and cable clamp 10 of the present invention attached to a frame member 12 and shown clamping three liquid carrying tubes 14 and a flat electrical ribbon cable 16. In an exemplary embodiment, liquid tubes 14 form an integral portion of aspirators like described above and ribbon cable 16 comprises a number of individual electrical conductors covered by an insulator and placed side-by-side, the connectors carrying electrical signals between an aspirator transport device, interface devices and a control computer. Tube and cable clamp 10 is provided with a number of unique features described hereinafter in order to facilitate assembly and secure clamping of tubes 14 and cable 16.

Figure 2:
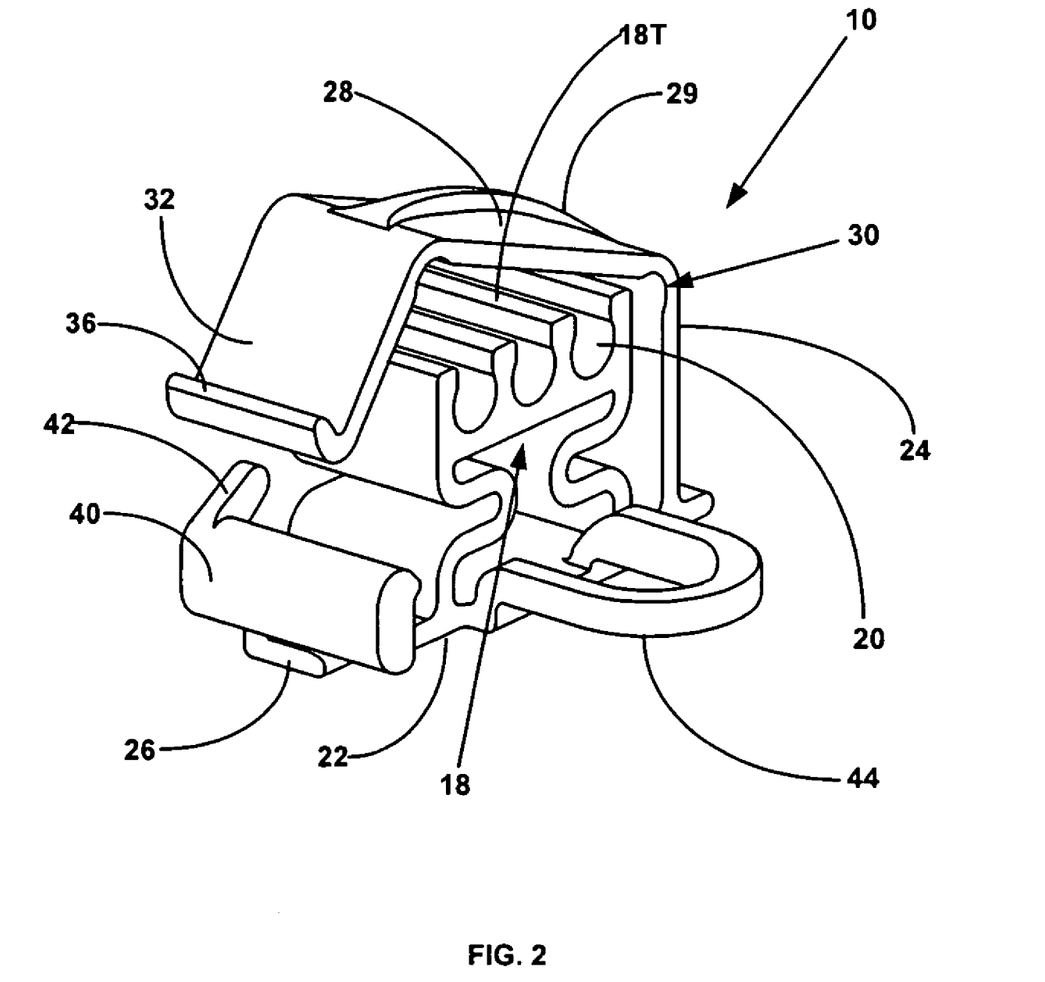
FIG. 2 is a left perspective view of the tube and cable clamp of FIG. 1 in an opened position.
Figure 3:
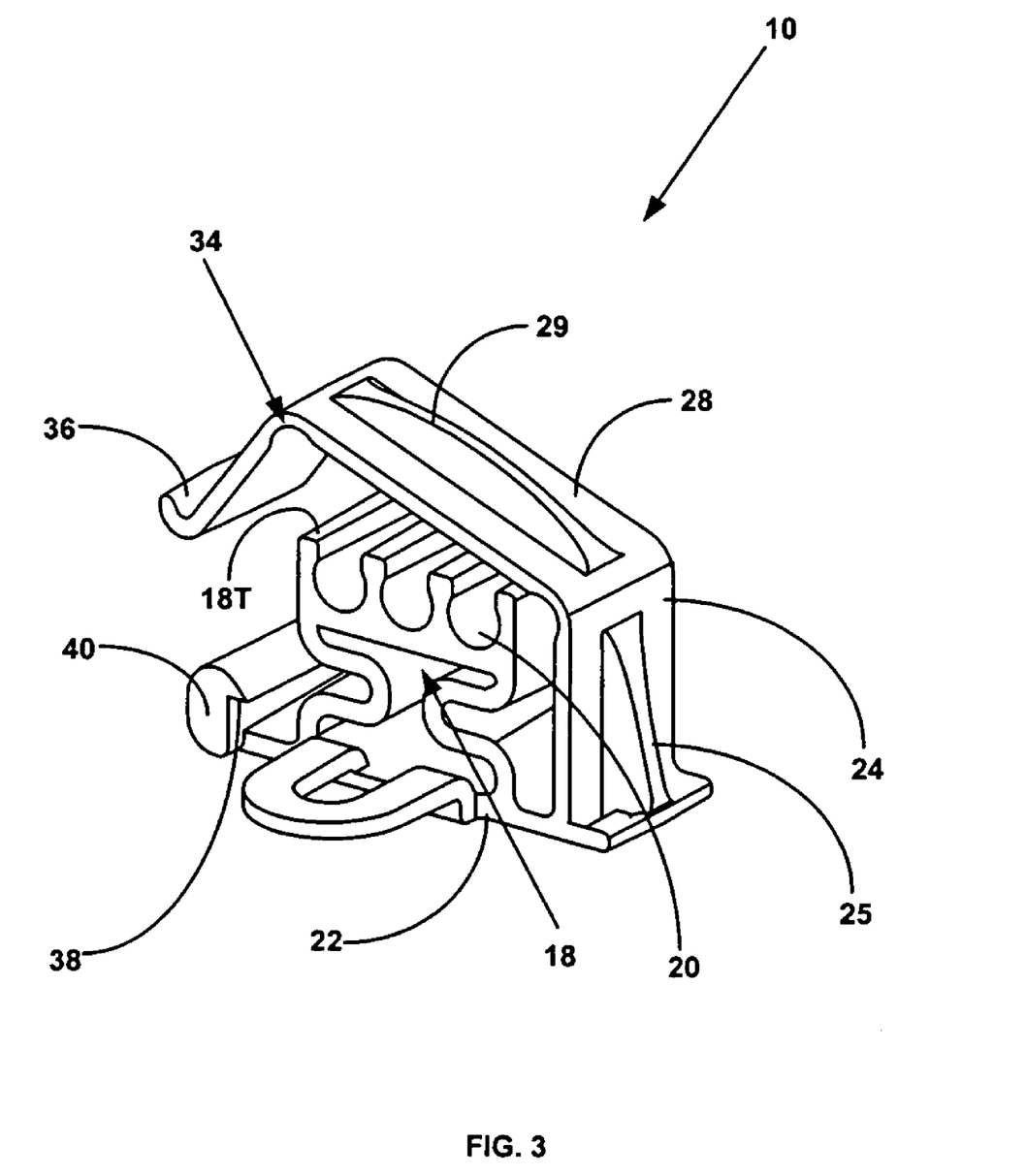
FIG. 3 is a right perspective view of the tube and cable clamp of FIG. 1 in an opened position.

FIG. 2 is a left front perspective view of the tube and cable clamp 10 of FIG. 1 showing clamp 10 in an opened position, clamp 10 having a compressible tube carrying center member 18 with a number of parallel open tube groves 20 formed in the top portion of tube carrying center member 18. Three groves are illustrated, however, it is obvious to an artesian that center member 18 and groves 20 may be sized in order to secure any number of tubes 14 that typically carry a liquid but may also carry a vacuum and/or a pressurized gas. FIG. 3 is a right front perspective view of the tube and cable clamp 10 of FIG. 1 showing clamp 10 having a generally planar base 22 having front, right side and left side and back portions and a right side wall 24 vertically extending from said right portion and an optional positioning hook 26 (best seen in FIG. 5) extending from said back portion. Taken with FIG. 2, FIG. 3 also shows an important feature of the present invention as being a clasp member 28 flexibly formed integral with right side wall 24 by means of a reduced wall portion 30, clasp member 28 being moveable towards tube carrying center 18 so as to close parallel open tube groves 20 thereby to secure tubes 14 and ribbon cable 16 between the top surface 18T of tube carrying center 18 and clasp member 28 (as seen in FIG. 4A). The tube carrying center member 18 preferably comprises a compressible thermoplastic resin material selected so ribbon 16 cable can be clamped between the top surface of the tube carrying center 18T and the clasp member 28 when a foot portion 36 engages an inner lip portion 38 of the left side wall 40 as described hereinafter.

A reinforcing ledge 29 is formed as an integral part of clasp member 28 in order to provide extra strengthening when clasp 28 is closed over tubes 14 and ribbon cable 16. Similarly, a reinforcing brace 25 is formed as an integral part of side wall 24 in order to provide extra rigidity in supporting clasp member 28. Another important feature of the present invention is a locking member 32 flexibly formed integral with clasp member 28, locking member 32 having a foot portion 36 and being moveable so as to engage an inner lip portion 38 of a left side wall 40 extending upwardly from base 22. A guide finger 42 is formed at the rear of left side wall 40 to facilitate locking of foot portion 36 and lip portion 38 as described hereinafter. An open tab 44 extends frontwardly from base 22 to facilitate attachment of clamp 10 as described hereinafter.

Figure 4:
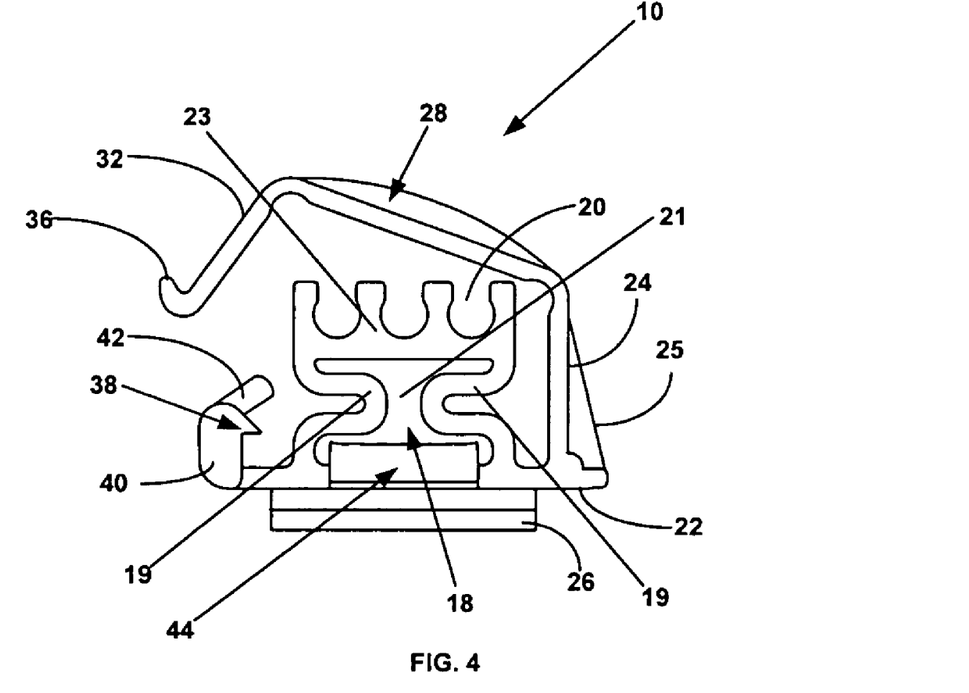
FIG. 4 is a front elevation view of the tube and cable clamp of FIG. 1 in an opened position.
Figure 4A:
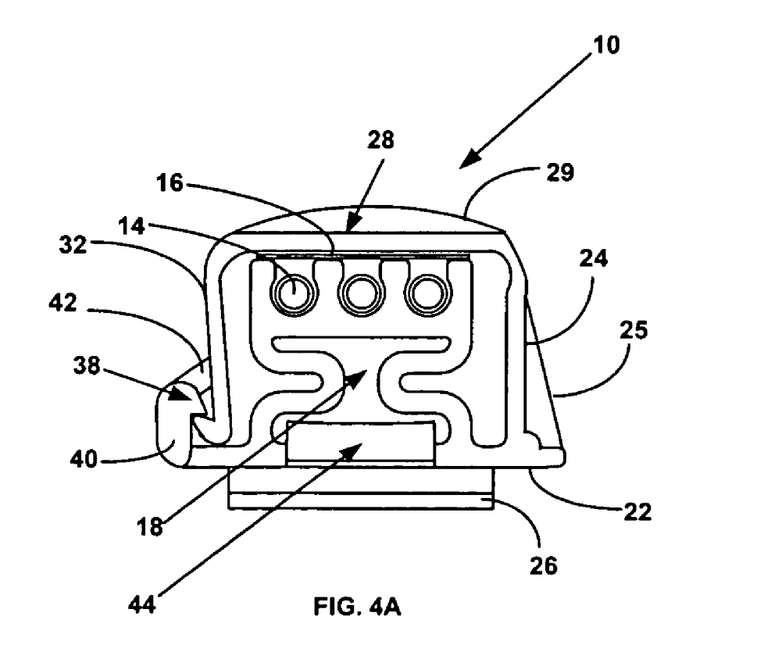
FIG. 4A is a front elevation view of the tube and cable clamp of FIG. 1 in a closed position.

FIG. 4 is a front elevation view of tube and cable clamp 10 with clasp member 28 in an open position that exposes tube groves 20 so that one of more liquid carrying tubes 14 may be easily inserted therein. Tube carrying center 18 is illustrated as comprising a pair of opposed truncated-S-shaped legs 19 integrally formed with base 22 and, in combination with a corrugated top member 23, defining an open center portion 21. Tube groves 20 define the corrugations in corrugated top member 23. Clamp 10 is made from a deformable plastic described hereinafter with a modulus selected such that tube carrying center 18 may be slightly compressed by clasp member 28 securing tubes 14 and cable 16 when in a closed position like seen in FIG. 4A.

FIG. 4A is a front elevation view of the tube and cable clamp of FIG. 1 in a closed position in which three tubes 14 have been placed within tube groves 20 and a flat electrical cable 16 has been placed over the top of corrugated top member 23. The illustration of a single cable 16 is not intended to be limiting, as is obvious to an artesian, more than one such cable 16 may be placed over the top of corrugated top member 23 with simple adjustments of the dimensions of top member 23 and clasp member 28. Clasp member 28 is illustrated in a closed position securing tubes 14 and cable 16 and locking member 32 has been placed in a locked position in which foot portion 36 is trapped beneath inner lip portion 38 of left side wall 40. During the process of placing locking member 32 in a locked position, finger portion 42 of left side wall 40 so that foot portion 36 is easily slipped beneath inner lip portion 38. Finger 42, in conjunction with wall 40, acts to prevent foot 36 from being pulled sideways by external forces applied by the tubes 14 or cable 16. Resistance to the compression of tube carrying center 18 acts to maintain foot portion 36 of locking member 32 engaged underneath inner lip portion 38.

Figure 5:
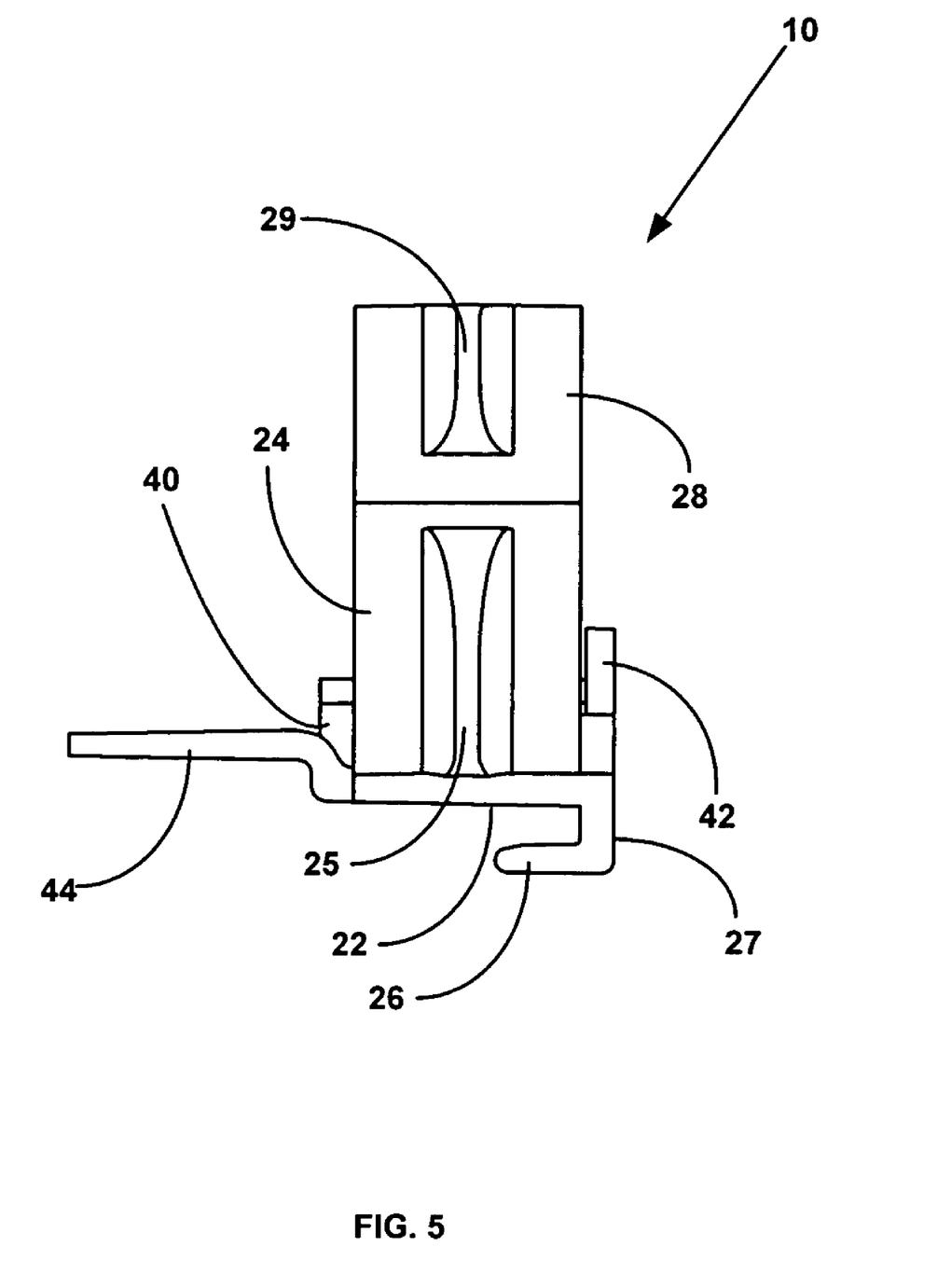
FIG. 5 is a side elevation view of the tube and cable clamp of FIG. 1 in an opened position.
Figure 6:
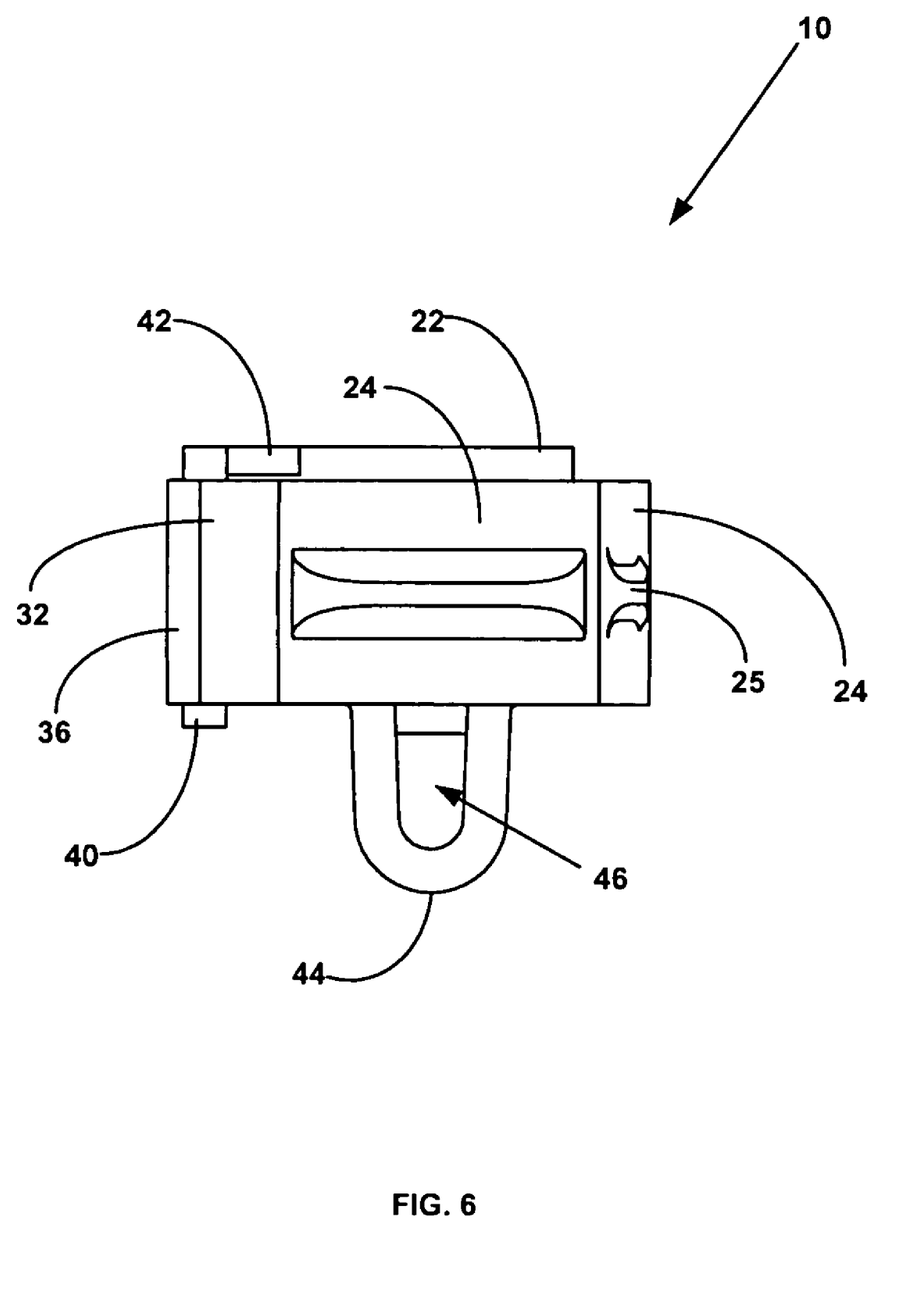
FIG. 6 is a top view of the tube and cable clamp of FIG. 1.
Figure 7:
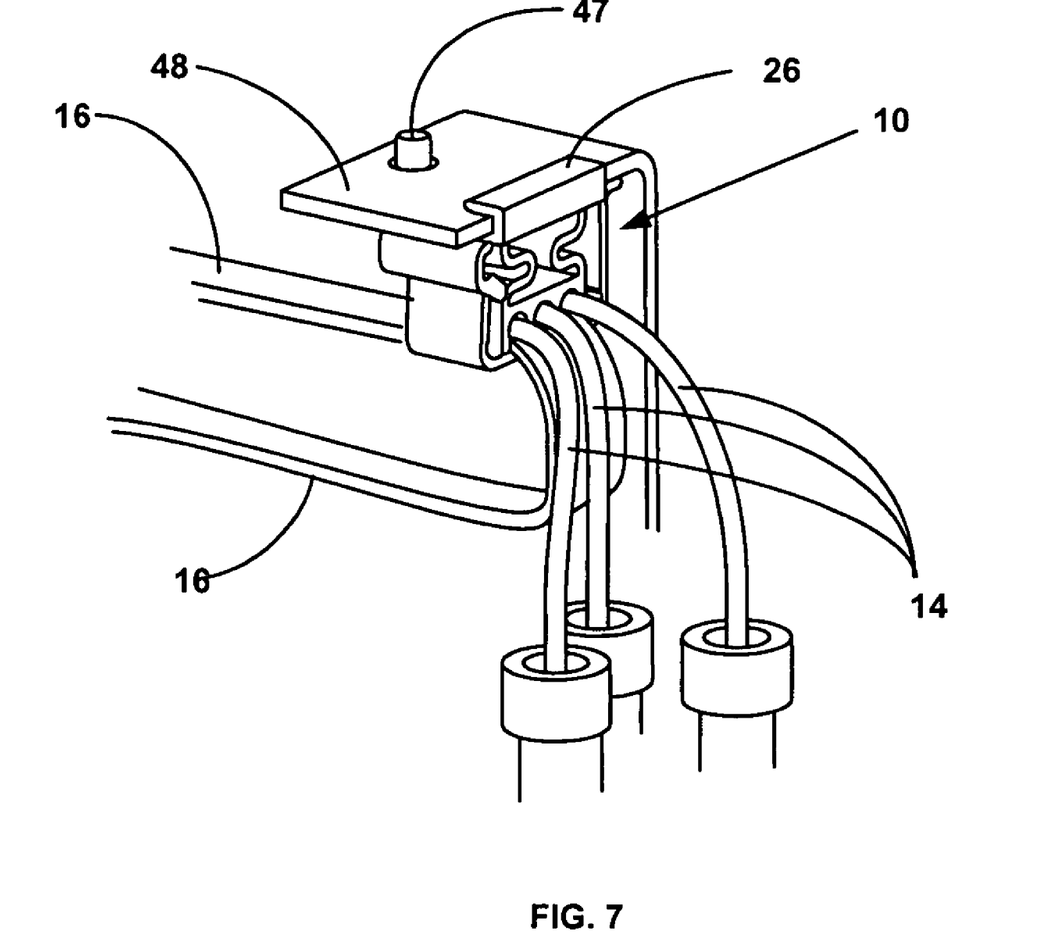
FIG. 7 is a perspective assembly view of the tube and cable clamp of FIG. 1 attached to a frame member and shown clamping three tubes and a flat electrical ribbon cable.

FIG. 5 is a side elevation view of the tube and cable clamp of FIG. 1 illustrating positioning hook 26 as being integral with base 22 extending frontward from a depending ledge 27. FIG. 6 is a top view of the tube and cable clamp of FIG. 1 and best illustrates opening 46 in tab 44 through which rivulet 47 attaches clamp 10 to an appropriate surface. FIG. 7 is a perspective assembly view of clamp 10 attached to a frame member 48 and thereon thereto by positioning hook 26 and secured thereto by a screw or rivulet 47 inserted though opening 46 in tab 44. Note that even though clamp 10 is "inverted", tubes 14 and cable 16 are secured by clasp member 28 clamping tubes 14 and cable 16 when in a closed position like seen in FIG. 4A.

Clamp 10 may be molded from any of a number of thermoplastic resin materials, including polyolefins and polyethylene, preferred because of lifetime in flex operations. Clamp 10 can also be comprised of a combination of such resins. Preferably however, because of the necessity for precise dimensioning, an engineering plastic like acrylonitrile butadiene styrene, ABS, a copolymer of acrylonitrile, butadiene, and styrene may be advantageously employed. ABS plastics generally possess medium strength and performance and medium cost and are often used as the cost and performance dividing line between standard plastics (PVC, polyethylene, polystyrene, etc.) and engineering plastics (nylon, acetal, etc.).

It should be readily appreciated by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. For example, as mentioned, the dimensions of top member 23 and clasp member 28 can be adjusted to accommodate more than one electrical cable 16 and/or center member 18 and groves 20 may be sized in order to secure any number of tubes 14. Accordingly, while the present invention has been described herein in detail in relation to specific embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A clamp for securing a number of tubes and flat electrical cables to a surface, said clamp comprising:
    a planar base having a front, right and left and back portions;
    a right side wall vertically extending from said right portion;
    a left side wall vertically extending from said left portion and having an inner lip portion at the top thereof;
    a liquid tube carrying center member integral with the planar base and extending upwards therefrom and having parallel open tube grooves formed at the top of said tube carrying center member; and,
    a clasp member flexibly formed integral with right side wall and extending over the liquid tube carrying center member,
    wherein the liquid tube carrying center member comprises a compressible material so that at least one ribbon cable can be clamped between the top surface of the tube carrying center and the clasp member when said foot portion engages the inner lip portion of the left side wall.

2. The clamp of claim 1 wherein clasp member further comprises a locking member having a foot portion engaging inner lip portion of the left side wall, said locking member being moveable so as to close parallel open liquid tube carrying grooves thereby to secure tubes within the parallel open tube grooves.

3. The clamp of claim 1 wherein a finger portion is formed at the rear of the left side wall to facilitate assembly and stability.

4. The clamp of claim 1 comprising an engineering plastic material.

5. The clamp of claim 1 further comprising a positioning hook extending from the back portion.

* * * * *